US012725242B2

(12) United States Patent
Craighero

(10) Patent No.: US 12,725,242 B2
(45) Date of Patent: Sep. 1, 2026

(54) METHOD FOR EVALUATING THE SURFACE OF A BODY COMPONENT, AND METHOD FOR TRAINING AN ARTIFICIAL NEURAL NETWORK

(71) Applicant: Bayerische Motoren Werke Aktiengesellschaft, Munich (DE)

(72) Inventor: Philipp Craighero, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 240 days.

(21) Appl. No.: 18/572,876

(22) PCT Filed: Aug. 10, 2022

(86) PCT No.: PCT/EP2022/072442

§ 371 (c)(1),
(2) Date: Dec. 21, 2023

(87) PCT Pub. No.: WO2023/030842

PCT Pub. Date: Mar. 9, 2023

(65) Prior Publication Data

US 2024/0311991 A1 Sep. 19, 2024

(30) Foreign Application Priority Data

Sep. 6, 2021 (DE) ..................... 10 2021 122 939.1

(51) Int. Cl.
*G06T 7/00* (2017.01)
*G06T 7/64* (2017.01)

(52) U.S. Cl.
CPC .............. *G06T 7/0004* (2013.01); *G06T 7/64* (2017.01); *G06T 2207/20081* (2013.01); *G06T 2207/20084* (2013.01); *G06T 2207/30136* (2013.01)

(58) Field of Classification Search
CPC ..................... G06T 7/0004; G06T 7/64; G06T 2207/20081; G06T 2207/20084;
(Continued)

(56) References Cited

U.S. PATENT DOCUMENTS 10,346,969 B1 * 7/2019 Raghu .................... G06V 10/82
2018/0017501 A1 * 1/2018 Trenholm .......... G01B 9/02091
(Continued)

FOREIGN PATENT DOCUMENTS

CN 108334878 A 7/2018
CN 110751151 A 2/2020
DE 10 2018 207 411 A1 11/2019

OTHER PUBLICATIONS

Jovancevic, I. et al. “3D Point Cloud Analysis for Detection and Characterization of Defects on Airplane Exterior Surface”, Journal of Nondestructive Evaluation, Oct. 17, 2017, pp. 1-17, vol. 36, No. 4, Plenum Publishing Corporation, New York, US, XP036368940 (17 pages) (Year: 2017).*

(Continued)

*Primary Examiner* — Van D Huynh
(74) *Attorney, Agent, or Firm* — Crowell & Moring LLP

(57) ABSTRACT

A method for evaluating the surface of a body component of a motor vehicle is provided. A virtual polygonal network of the surface is generated, at least one variable which characterizes a curvature of the polygonal network at at least one node of the polygonal network is determined, and at least one output variable which characterizes a surface defect of the surface is determined based on the variable which characterizes the curvature using an artificial neural network in order to evaluate the surface.

5 Claims, 7 Drawing Sheets

(58) Field of Classification Search
CPC . G06T 2207/30136; G06T 2207/10028; G06T 2207/30164
See application file for complete search history.

(56) References Cited

U.S. PATENT DOCUMENTS

| | | | | |
|---|---|---|---|---|
| 2018/0268257 | A1* | 9/2018 | Ren | G06T 7/0004 |
| 2019/0051013 | A1* | 2/2019 | Kwant | G06T 7/75 |
| 2019/0287237 | A1* | 9/2019 | de Bonfim Gripp | G06T 7/64 |
| 2020/0364842 | A1* | 11/2020 | Chaton | G06V 10/82 |
| 2022/0044383 | A1 | 2/2022 | Koshihara et al. | |
| 2022/0178838 | A1* | 6/2022 | Orzol | G06T 7/75 |

OTHER PUBLICATIONS

Jovancevic, I. et al. "3D Point Cloud Analysis for Detection and Characterization of Defects on Airplane Exterior Surface", Journal of Nondestructive Evaluation, Oct. 17, 2017, pp. 1-17, vol. 36, No. 4, Plenum Publishing Corporation, New York, US, XP036368940 (17 pages).
International Search Report (PCT/ISA/210) issued in PCT Application No. PCT/EP2022/072442 dated Dec. 9, 2022 with English translation (5 pages).
German-language Written Opinion (PCT/ISA/237) issued in PCT Application No. PCT/EP2022/072442 dated Dec. 9, 2022 with English translation (9 pages).
German Search Report issued in German Application No. 10 2021 122 939.1 dated Oct. 19, 2022 with partial English translation (11 pages).
English translation of Chinese-language Office Action issued in Chinese Application No. 202280043005.5 dated Apr. 16, 2026 (8 pages).

* cited by examiner 6,16
11
6,16
6,16

A
12
13
14
15
$k_1$
$k_2$
A
10
11

METHOD FOR EVALUATING THE SURFACE OF A BODY COMPONENT, AND METHOD FOR TRAINING AN ARTIFICIAL NEURAL NETWORK

BACKGROUND AND SUMMARY

The invention relates to a method for evaluating the surface of a body component of a motor vehicle. Furthermore, the invention relates to a method for training an artificial neural network.

Such a method for evaluating the surface of a body component of a motor vehicle and such a method for training an artificial neural network can be inferred as known from the general prior art. The surface of the body component can be assessed or checked, in particular manually. For example, the surface can be checked for any surface flaws. The surface flaws can be used to evaluate the surface.

It is an object of the invention to provide a method for evaluating the surface of a body component of a motor vehicle and a method for training an artificial neural network, so that work effort and costs for producing the body component can be kept particularly low.

This object is achieved according to the invention by a method for evaluating the surface of a body component of a motor vehicle and by a method for training an artificial neural network according to the independent claims. Advantageous embodiments of the invention are the subject matter of the dependent claims and the description.

A first aspect of the invention relates to a method for evaluating the surface of a body component of a motor vehicle. The motor vehicle can be designed, for example, as a passenger vehicle, utility vehicle, or truck. The body component can be understood in particular as a component of a body of the motor vehicle. The body can in particular be a self-supporting body of the motor vehicle. The body component is preferably an outer skin component of the body or the motor vehicle. The outer skin component can be understood in particular to mean that the body component is a component of an outside of the motor vehicle delimiting the motor vehicle to the outside. The body component can be formed, for example, from a plate. The body component can thus in particular be designated as a body plate.

In the method, at least one virtual polygon network of the surface of the body component is created. In other words, at least one virtual map of the surface of the body component is created or formed, wherein the virtual map is designed as a polygon network. The virtual map can be understood in particular as a virtual model of the surface. The polygon network can in particular be understood as points connected by edges, wherein the polygon network comprises a plurality of polygons which can be formed, for example, as triangles or as quadrangles. The respective polygon comprises multiple points, in particular referred to as nodes, which are connected to one another via edges of the polygon. The surface of the body component is approximated by the virtual polygon network.

The respective node can be designated in particular as a "vertex". The nodes form respective corners of the respective polygon in the geometry of the polygon network. The polygon network is preferably three-dimensional. Alternatively, the polygon network can be two-dimensional.

The polygon network is preferably an STL network. In the STL network, the surface of the body component is described or approximated by triangular facets. Each triangular facet can be respectively characterized by three corner points and one associated surface normal of the triangle. The STL network is in particular a polygon network which has a format referred to in particular as the STL format.

It is provided that at least one variable characterizing a curvature of the polygon network is determined at at least one node of the polygon network. In other words, at least one variable characterizing a curvature at at least one node of the polygon network is determined. In other words, the at least one variable characterizing the curvature of at least a subsection of the surface is determined in dependence on the polygon network. The variable characterizing the curvature can be computed, for example. The variable characterizing the curvature can be understood in particular as a measure or a value by means of which the curvature of the polygon network can be characterized or described, in particular at the respective node. Therefore, in dependence on the variable characterizing the curvature, the curvature of the polygon network, in particular at the respective node, or the curvature of the surface of the body component can be concluded. The variable characterizing the curvature of the polygon network is preferably determined at or for all nodes of the polygon network.

For example, a map referred to in particular as a Weingarten map can be computed to determine the variable characterizing the curvature at or for the at least one node, in particular all nodes, of the polygon network. A matrix referred to in particular as a Weingarten matrix or Weingarten curvature matrix can be computed here for the respective node. Eigenvalues of the Weingarten map or the Weingarten matrix correspond to main curvatures of the polygon network, evaluated at the respective node. The main curvatures can in particular be designated as K1 and K2. The main curvature can be understood in general as a curvature of a planar curve which results through a normal section. The normal section can be understood in particular as a section of a surface with a plane defined by a surface normal vector of the surface and a tangential direction of the surface. The main curvatures are then a minimum value and a maximum value of these curvatures. Directions of the eigenvectors can be designated in particular as the main curvature directions. The main curvature directions can be understood in particular as tangential directions. One of the main curvatures can be designated in particular as the so-called first main curvature. The other main curvature can be designated in particular as the so-called second main curvature.

One example for computing the Weingarten map or the main curvatures and main curvature directions can be inferred from the literature: Goldfeather, Jack und Interrante, Victoria (2004). A novel cubic-order algorithm for approximating principal direction vectors, ACM Transaction on Graphics, Volume 23, Issue 1, pp 45-63.

For example, the Weingarten map can be computed at at least one node, in particular at all nodes, of the polygon network. This can be carried out as follows, for example:

First, a normal vector is computed or approximated at at least one of the nodes, in particular at all nodes, of the polygon network. The normal vector corresponds to or approximates a normal of the polygon network, in particular a surface of the polygon network, in the respective node. Two vectors extending orthonormal to one another, which extend perpendicular to the respective normal vector, are then computed at at least one of the nodes, in particular at all nodes, of the polygon network. The vectors and the normal vector are used at the respective node as a local orthonormal coordinate system. The Weingarten map or the Weingarten curvature matrix is then computed in at least one of the nodes, in particular in all nodes, of the polygon network, expressed in the respective local coordinate system. This can be carried out, for example, by means of a method designated in particular as a normal curvature approximation method or by means of a method designated in particular as a quadratic surface approximation method or by means of a method designated in particular as an adjacent normal cubic approximation method or by means of methods in particular designated as higher order methods.

The main curvatures and/or the main curvature directions can be used as the variable characterizing the curvature. In other words, the main curvatures and/or the main curvature directions can be determined as the variable characterizing the curvature at at least one node, in particular at all nodes, of the polygon network. In still other words, the Weingarten map, from which the main curvatures and/or the main curvature directions can be computed, can be computed for at least one node, in particular for all nodes, of the polygon network.

The virtual polygon network is preferably stored in an electronic computing device after the creation. The variable characterizing the curvature is preferably stored in the electronic computing device or in a second electronic computing device formed separately from the electronic computing device.

To be able to keep costs of the body component particularly low, it is provided that as a function of the variable characterizing the curvature, at least one output variable characterizing a surface flaw of the surface is determined at least indirectly, in particular directly, by means of an artificial neural network for evaluating the surface. In other words, the variable characterizing the curvature is an input variable of the neural network, wherein the output variable, which is a variable characterizing the surface flaw of the surface, is determined by means of the neural network as a function of the variable characterizing the curvature. The output variable characterizing the surface flaw of the surface is an output variable of the neural network.

The neural network can be designated in particular as an artificial neural network. The artificial neural network can be understood in particular as software code which is stored on a computer-readable storage medium and represents one or more networked artificial neurons or can simulate their function. The software code can in particular contain multiple software code components, which can have different functions, for example. In particular, an artificial neural network can implement a nonlinear model or a nonlinear algorithm, which maps an input on an output. The input can be given by an input feature vector or an input sequence. The output can contain, for example, an output category for a classification task, one or more predicted values, or a predicted sequence. The entry or the input can thus comprise the variable characterizing the curvature. The output can comprise, for example, the variable characterizing the surface flaw. The neural network is preferably a trained neural network.

The surface flaw can be understood in particular as a deviation between an actual condition of the surface of the body component and a target condition of the surface of the body component. The surface flaw can therefore be a deviation between a target surface of the body component and an actual surface of the body component. The target condition or the target surface can in particular be understood as a defined desired condition of the surface. This condition can be provided during the production of the surface of the body component. The actual condition or the actual surface can be understood in particular as a real condition of the surface of the body component, wherein the real condition is present after the production of the body component or the surface. The deviation or a difference between the target surface and the actual surface can thus result from the production of the body component, in particular a production error or a production inaccuracy. The surface flaw can be a dent, for example. Alternatively, the surface flaw can be a waviness of the surface, for example. It can be provided that the deviation between the target surface and the actual surface is only a surface flaw or is only viewed as the surface flaw when the deviation exceeds a predefined threshold value.

The output variable characterizing the surface flaw can be understood in particular as an arbitrary measure or an arbitrary value which characterizes or describes the surface flaw. The surface flaw can therefore be concluded by means of the output variable characterizing the surface flaw. For example, the output variable characterizing the surface flaw can assume or have at least two values, in particular discrete values. A first of the values can mean, for example, that the respective surface has the surface flaw. The second value can mean, for example, that the respective surface does not have the surface flaw and is therefore free of flaws.

For example, the output variable characterizing the surface flaw can comprise multiple flaw classes which are different from one another. In other words, the output variable characterizing the surface flaw can assume at least one of multiple values which are different from one another, wherein the respective value characterizes the respective flaw class of the surface flaw. The values can be designated here in particular as flaw class values. For example, the dent of the surface can be one of the flaw classes. For example, the wavy surface can be another of the flaw classes. For example, a first of the flaw class values is determined by means of the artificial neural network, wherein the respective surface of the body component has a surface flaw of a first of the flaw classes. For example, a second flaw class value different from the first flaw class value is determined by means of the artificial neural network when the respective surface of the body component has a surface flaw of the second flaw class.

Alternatively or additionally, the output variable characterizing the surface flaw can comprise at least one measure for characterizing a flaw severity of the surface flaw. For example, a first intensity value of the output variable characterizing the surface flaw is determined by means of the artificial neural network if the respective surface of the respective body component has a first surface flaw, and a second intensity value, which is greater than the first intensity value, of the output variable characterizing the surface flaw is determined by means of the neural network if the respective surface of the respective body component has a second surface flaw more severe than the first surface flaw.

Alternatively or additionally, the output variable characterizing the surface flaw has at least one measure for characterizing a position of the flaw on the surface of the body component. For example, the output variable characterizing the surface flaw comprises coordinates for this purpose, wherein the coordinates describe the position or a location of the surface flaw on the surface of the respective body component.

The invention is based in particular on the following findings and considerations: Body components can typically be produced by means of forming. Forming tools are used here. It can occur during the production of the body components by means of the forming tool that a surface flaw occurs. To prevent this and thus to check a suitability of the forming tool, in particular for series production of the body component, for example, in the pressing mechanism, it can be provided that the surface of the body component is checked. It is conceivable in principle here to produce trial parts of the body component, designated in particular as trial pressings, by means of the forming tool. These trial components can subsequently be painted, in particular black, and checked manually, in particular by experts, subjectively for surface flaws. A development of the forming tool can typically already have been completed here. Any changes or adjustments of the forming tool can thus be particularly time-intensive and particularly costly. It can typically only be recognized inadequately during the development of the forming tool whether body components to be produced by means of the forming tool tend toward surface flaws or whether differences between a target geometry and an actual geometry of the body component represent a relevant surface flaw. This problem can exist, for example, in a process step of the development of the forming tool in which the forming tool is developed by means of simulation, in particular finite element simulation. The problem can alternatively or additionally exist during incorporation of toolsets into toolmaking of the or for the forming tool.

In contrast, the surface flaw or flaws can already be recognized during the development of the forming tool by means of the method according to the invention. Instead of the manual checking or assessing, in particular by the experts, in the method according to the invention, the surface flaw is evaluated or assessed by means of the neural network. The experts can be emulated here by the neural network. Required measures can thus already be performed early during the development of the forming tool. The measures can be understood, for example, as measures by means of which the forming tool can be adapted or improved, so that the surface flaw occurring during the production of the respective body component can be avoided or reduced. Costs, in particular production costs and effort, in particular production effort, of the body component can be kept particularly low in particular because in the method according to the invention, measures can be taken or implemented in a particularly early development stage of the body component.

In a further embodiment, it is provided that at least one image of the surface of the body component arranged in a capture area of the optical capture device is captured by means of an optical capture device, wherein the virtual polygon network is created in dependence on the image. In other words, the surface arranged in the capture area of the optical capture device is captured by means of the optical capture device, wherein the captured surface is digitized as the virtual polygon network. A real surface of the body component can thus be assessed by means of the neural network. The optical capture device is preferably a camera, in particular a stereo camera, for example, a GOM stereo camera.

In a further embodiment, it is provided that the virtual polygon network is created as a function of at least one simulation result of a simulation, in particular a structural-mechanical and/or thermomechanical simulation, of at least one step of a simulated production process of the body component. This can be understood in particular to mean the following: By means of the simulation, at least one step of the production process or the complete production process of the body component is simulated. In this simulation, the simulation result is computed. The simulation can be structural-mechanical and/or thermomechanical. The simulation can comprise additional further effects here. The simulation result can be, for example, a virtual model or a virtual map of the surface of the body component, wherein the virtual map can be deformed, for example, in relation to the target surface of the body component. This deformation is a result of the production process, which is simulated in particular, of the body component. The virtual polygon network of the surface is created from the simulation result or from the simulated map of the surface. A virtual or simulated surface of the body component can thus be evaluated by means of the neural network. The evaluation can thus, for example, take place in a particularly early stage of a development process of the body component or the forming tool.

In a further embodiment, it is provided that before the determination of the respective variable characterizing the curvature, a respective smoothing of the respective polygon network is carried out. The variable characterizing the curvature of the polygon network can thus be determined at the at least one node of the smoothed polygon network. Noise can thus be suppressed in the polygon network or in the variable characterizing the curvature. The smoothing can be designated in particular as filtering.

For example, the image can in particular comprise interference designated as image noise. The interference can have no relationship to the desired image content of the image, namely the map of the surface. Because the polygon network has been created or is being created in dependence on the image, the polygon network can have the image noise or the interference. In the case of such interference, for example, a position of at least one node of the polygon network can have no relationship to the real surface. For example, coordinates of the node can significantly differ here from the respective coordinates of the surface of the body component. To reduce or to compensate for the image noise or the interference, the smoothing of the polygon network can be carried out. In this case, for example, a position or coordinates of at least one node of the polygon network can be displaced, in particular in a respective normal direction, by which the image noise can be reduced. One exemplary method for smoothing can be taken from the literature: Fleishman, Shachar und Drori, Iddo und Cohen-Or, Dabniel (2003). Bilateral mesh denoising, ACM Transactions on Graphics.

In a further embodiment, it is provided that at least one two-dimensional geometric map of the polygon network is formed, wherein the output variable characterizing the surface flaw is determined at least indirectly, in particular directly, in dependence on the geometrical map by means of the artificial neural network. In other words, the polygon network as a geometric map is transformed into a two-dimensional plane, wherein the geometric map is used as an input or input variable of the neural network.

The geometric map can be understood in particular to mean that each point of the polygon network is assigned a respective point in the two-dimensional plane. For example, at least one or each node of the polygon network in the two-dimensional plane can be assigned a respective node or point. For example, at least one or each edge of the polygon network can be assigned a respective edge in the two-dimensional plane. The polygon network is therefore incorporated indirectly as an input variable or input into the neural network via the geometric map. The geometric map is a particularly suitable input variable of the neural network here. Storage requirement and learning complexity can thus be kept particularly low in the neural network. The geometric map can be designated in particular as a geometry map. The geometric map can be equivalent, for example, to a two-dimensional matrix.

The geometric map is preferably an authalic spherical parameterization. An exemplary geometric map or an exemplary method for carrying out such a geometric map can be inferred from the literature: Sinha, Ayan und Bai, Jing und Ramani, Karthik (2016). Deep Learning 3D Shape Surfaces Using Geometry Images, European Conference on Computer Vision, pp 223-240.

The spherical parameterization can be understood in particular as the following: Firstly, a two-dimensional geometric map of the polygon network, which is different from the geometric map and in particular is designated as an intermediate step or intermediate map, can be created by parameterization of a three-dimensional shape, in particular of the polygon network. The intermediate map can then be mapped or scanned on an octahedron. The octahedron can subsequently be cut or cut off along its edges to create the geometric map.

The authalic parameterization can be understood in particular as an area-retaining parameterization. The spherical authalic parameterization can be understood in particular as a combination of the spherical parameterization and the authalic parameterization. In the authalic spherical parameterization, in the polygon network used as the input variable of the authalic spherical parameterization, spatial distortions can be iteratively minimized and a bijective map can be created on a sphere surface.

In a further embodiment, it is provided that at least one pixel of the geometric map is assigned the respective variable characterizing the curvature, wherein in dependence on the at least one pixel assigned the variable characterizing the curvature, the output variable characterizing the surface flaw is determined at least indirectly, in particular directly, by means of the artificial neural network. In other words, in the geometric map, at least one, in particular each node of the polygon network is assigned the respective pixel in the geometric map, wherein the variable of the respective node or for the respective node characterizing the curvature is assigned to the respective pixel of the geometric map. In dependence on the pixel and the variable characterizing the curvature which is assigned to the respective pixel, the output variable characterizing the surface flaw is determined by means of the artificial neural network. In still other words, the output variable characterizing the surface flaw is determined in dependence on the geometric map, which comprises the respective variable characterizing the curvature, by means of the artificial neural network.

The respective pixel of the geometric map being assigned the respective variable characterizing the curvature can be understood in particular to mean that the geometric map or the pixel having the respective variable characterizing the curvature is coded, in particular colored. The variable characterizing the curvature can thus be characterized or represented, for example, in dependence on a color or a color intensity of the geometric map, in particular of the pixel.

The variable characterizing the curvature can comprise, for example, multiple subvariables. It can be provided that for each of the subvariables a respective two-dimensional geometric map of the polygon network is formed, wherein at least one pixel, in particular all pixels, of the respective geometric map is assigned the respective subvariable characterizing the curvature. Alternatively, it can be provided that one, in particular precisely one, two-dimensional geometric map of the polygon network is formed, wherein at least one pixel, in particular all pixels, of the geometric map are all assigned respective subvariables characterizing the curvature. For example, a first of the subvariables can be the first main curvature. For example, a second of the subvariables can be the second main curvature.

The respective variable characterizing the curvature can comprise, for example, at least one expanded curvature value. The expanded curvature value can be, for example, a shape index of the curvature and/or an intensity index of the curvature. In other words, the shape index and/or the curvature index can be used as the variable characterizing the curvature. For example, a third of the subvariables can be the shape index. For example, a fourth of the subvariables can be the intensity index. The variable characterizing the curvature can thus comprise the first main curvature and/or the second main curvature and/or the shape index and/or the intensity index.

The shape index and the intensity index (curvedness intensity) are described, for example, in the following citation: Koenderink, Jan und Doorn, Andrea (1992). Surface shape and curvature scales, Image and Vision Computing, Volume 10, Issue 8, October 1992, Pages 557-564.

By means of the shape index, a shape, in particular a geometric shape, of the curvature can be characterized or described. The shape index can be calculated as a function of the main curvatures ($k_1$, $k_2$). Therefore, in particular instead of the main curvatures, the curvature shape can be characterized by precisely one parameter, namely the shape index. The shape index (s) can preferably be calculated as follows:

$$s = \frac{2}{\pi}\arctan\frac{k_2 + k_1}{k_2 - k_1}(k_1 \gg k_2).$$

The shape index preferably assumes values between −1 and 1. Convex and concave and hyperbolic surfaces can be described or characterized by means of the shape index. Convex and concave surfaces can each be located on sides or ranges (in particular having different signs) of the scale different from one another. For example, a value pair the values of which differ from one another only with respect to their respective sign characterizes two surfaces formed corresponding to one another, for example, stamp and die.

An intensity or a strength of the curvature can be characterized or described by means of the intensity index. The intensity index can be calculated as a function of the main curvatures ($k_1$, $k_2$). Therefore, in particular instead of the main curvatures, the curvature intensity can be characterized by precisely one parameter, namely the curvature index. The curvature index (c) can preferably be calculated as follows:

$$c = \sqrt{\frac{k_1^2 + k_2^2}{2}}.$$

In the case of a sphere, the intensity index corresponds to an absolute value of a reciprocal value of a radius of the sphere.

The artificial neural network is preferably a neural network designed as a convolutional neural network (CNN). The CNN can be designated in particular as a convolutional neural network. The neural network is preferably an artificial neural network designed as a region-based convolutional neural network (R-CNN). Such a neural network is described, for example, in the following citation: Girshick, Ross and Donahue, Jeff and Darrell, Trevor and Malik, J (2014). Rich Feature Hierarchies for Accurate Object Detection and Semantic Segmentation, 2014 IEEE Conference on Computer Vision and Pattern Recognition, pages 580-587.

The two-dimensional map, in particular in relation to the three-dimensional polygon network, is particularly well suitable for use as an input variable in the CNN or R-CNN. This is also true for the training of the CNN or the R-CNN. Storage requirement and learning complexity can thus be kept particularly low in the CNN or R-CNN.

The R-CNN is preferably designed as a fast R-CNN or as a faster R-CNN. Such a neural network is described, for example, in the following citations:

Girshick, Ross. (2015). Fast R-CNN.

Ren, Shaoqing & He, Kaiming & Girshick, Ross & Sun, Jian. (2016). Faster R-CNN: Towards Real-Time Object Detection with Region Proposal Networks, IEEE Transactions on Pattern Analysis and Machine Intelligence, Volume 39, Issue 6, Pages 1137-1149.

The output variable characterizing the respective surface flaw preferably comprises at least one boundary frame, which completely surrounds the respective at least one pixel at which a respective surface flaw has been determined in the respective geometric map. In other words, the output variable characterizing the respective surface flaw comprises at least one item of location information or position information, which characterizes or describes a position of the boundary frame in the geometric map. The boundary frame is therefore a location or position specification of the surface flaw in the geometric map. For example, the output variable characterizing the surface flaw can comprise coordinates which describe or form the respective boundary frame. The boundary frame can completely surround multiple pixels in the respective geometric map, at which a respective surface flaw has been determined.

The output variable characterizing the respective surface flaw is preferably assigned to the respective pixel of the respective geometric map. For example, it can be provided that the output variable characterizing the respective surface flaw is assigned to the respective node of the polygon network, wherein the respective node of the polygon network is that node which is assigned to the respective pixel. The respective surface flaw or the position of the respective surface flaw on the surface can thus be represented particularly clearly on the respective polygon network.

A second aspect of the invention relates to a method for training an artificial neural network. Advantages and advantageous embodiments of the first aspect of the invention are to be viewed as advantages and advantageous embodiments of the second aspect of the invention and vice versa.

In the method, a respective virtual polygon network of at least one respective surface of a plurality of body components is created. In other words, a respective digital map of the respective surface of the body components is formed, wherein the digital map is designed as the virtual polygon network.

For example, a first virtual polygon network of at least one respective surface of a first of the body components is created. For example, a second virtual polygon network, different from the first virtual polygon network, of at least one respective surface of a second of the body components different from the first body component is created. The body components can be structurally identical or can differ from one another with respect to their respective design, in particular their geometry. The respective surface or the body components are preferably real components.

The respective surface of the respective body component is preferably arranged in a capture area of an optical capture device, wherein at least one image of the respective surface arranged in the capture area of the optical capture device is captured by means of the optical capture device and wherein the respective polygon network is created in dependence on the captured image. The respective virtual polygon network is preferably stored in an electronic computing device, in particular a database of the electronic computing device.

It is provided that at least one respective variable characterizing a curvature at at least one node of the respective polygon network is determined. In other words, the respective variable characterizing the curvature of the respective polygon network is determined at the at least one node, in particular at all nodes, of the respective polygon network.

The variables characterizing the curvature are preferably stored in the electronic computing device, in particular in the database. For example, it can be provided that before the capture of the respective surfaces by means of the optical capture device, the respective surfaces are painted, in particular white or matte white.

To be able to keep costs of the respective body component particularly low, the artificial neural network is trained at least indirectly, in particular directly, by means of the variables characterizing the curvature. In other words, a learning process of the artificial neural network in particular designated as learning is carried out by means of the variables characterizing the curvature.

It can be provided that in particular before and/or after the capture of the respective surface by means of the optical capture device, at least one respective variable characterizing a respective surface flaw of the respective surface of the respective body component is determined, in particular manually. The manual determination can preferably be carried out by experts. In other words, the respective surfaces can be examined and evaluated by the experts. During the examination, the body components can be installed, i.e., can be located in the installed position in the motor vehicle, or can be present as an individual part and can be mounted as desired for this purpose. Presence as an individual part can be understood in particular to mean that the respective body part is not located in its respective installed position in the motor vehicle.

The variable characterizing the surface flaw can be understood in particular as an arbitrary measure or an arbitrary value which characterizes or describes the surface flaw. The surface flaw can thus be concluded by means of the variable characterizing the surface flaw. For example, the variable characterizing the surface flaw can assume or have at least two values, which are discrete in particular. A first of the values can mean, for example, that the respective surface has the surface flaw. The second value can mean, for example, that the respective surface does not have the surface flaw and is thus free of flaws.

For example, the variable characterizing the surface flaw can comprise multiple flaw classes, which are different from one another. In other words, the variable characterizing the surface flaw can assume at least one of multiple values which are different from one another, wherein the respective value characterizes the respective flaw class of the surface flaw. The values can in particular be designated here as flaw class values. For example, the dent of the surface can be one of the flaw classes. For example, the wavy surface can be another of the flaw classes. For example, a first of the flaw class values is determined, in particular manually, if the respective surface of the body component has a surface flaw of a first of the flaw classes. For example, a second flaw class value different from the first flaw class value is determined, in particular manually, if the respective surface of the body component has a surface flaw of the second flaw class.

Alternatively or additionally, the variable characterizing the surface flaw can comprise at least one measure for characterizing a flaw severity of the surface flaw. For example, a first intensity value of the variable characterizing the surface flaw is determined, in particular manually, if the respective surface of the respective body component has a first surface flaw and a second intensity value, which is greater than the first intensity value, of the variable characterizing the surface flaw is determined, in particular manually, if the respective surface of the respective body component has a second surface flaw which is more severe than the first surface flaw.

Alternatively or additionally, the variable characterizing the surface flaw has at least one measure for characterizing a position of the flaw on the surface of the body component. For example, the variable characterizing the surface flaw comprises coordinates for this purpose, wherein the coordinates describe the position or a location of the surface flaw on the surface of the respective body component.

In a further embodiment, it is provided that the respective variable characterizing the respective surface flaw of the surface of the respective body component is assigned to at least one respective polygon of the respective polygon network, in particular an area and/or a node and/or an edge of the polygon. In other words, in dependence on the position of the respective surface flaw on the respective body component, the variable characterizing the respective surface flaw is assigned to the respective polygon or the respective polygons which approximates or approximate, in particular in the best possible manner, the position of the respective surface flaw on the respective polygon network. The variable characterizing the respective surface flaw of the surface of the respective body component is preferably stored in the electronic computing device, in particular in the database.

In particular if the determination of the variable characterizing the respective surface flaw is carried out before the capture of the respective surface by means of the optical capture device, the respective determined surface flaws or a position of the respective surface flaws can be marked on the respective surface, which is real in particular, of the body component. The respective marked surface flaws can thus be captured upon the capture of the respective surface by means of the optical capture device. Subsequently, the captured respective surface flaws or the respective captured positions of the respective surface flaws can be assigned to the respective polygon network, in particular to the respective node and/or the respective area and/or the respective edge.

In particular if the determination of the respective surface flaws is carried out after the optical capture of the respective surfaces by means of the optical capture device, it can be provided that the respective surface flaws or the respective position of the respective surface flaws on the respective polygon, in particular the respective node and/or respective area and/or respective edge of the respective polygon, of the polygon network is marked, in particular manually, and thus assigned to the respective polygon.

In a further embodiment, it is provided that at least one two-dimensional geometric map of the respective polygon network is formed, wherein at least one pixel, in particular multiple pixels, of the respective geometric map is assigned the variable characterizing the respective surface flaw and wherein the artificial neural network is trained at least indirectly, in particular directly, by means of the geometric map comprising the respective surface flaw. In other words, the respective polygon network is transformed as a geometric map into a two-dimensional plane, wherein the respective variable characterizing the respective surface flaw is assigned to the at least one pixel of the respective geometric map. The training of the neural network is carried out by means of the geometric maps and the variables characterizing the surface flaws and assigned to the pixels. The neural network can thus be trained particularly advantageously, due to which it can make particularly precise predictions.

It is preferably provided that at least one pixel of the geometric map is assigned the variable characterizing the respective curvature and the artificial neural network is trained at least indirectly, in particular directly, by means of the geometric map which comprises the variable characterizing the curvature. In other words, it can be provided that at least one two-dimensional geometric map of the respective polygon network is formed, wherein at least one pixel of the geometric map is assigned the variable characterizing the respective curvature and wherein the artificial neural network is trained by means of the geometric map, which comprises the variable characterizing the curvature.

It is preferably provided that at least one boundary frame is created in the respective geometric map, which completely surrounds the respective at least one pixel to which the variable characterizing the respective surface flaw is assigned, wherein the neural network is trained by means of the boundary frame. In other words, in the respective geometric map, the boundary frame surrounding the respective pixel, in particular multiple pixels, is formed, wherein the respective pixel is assigned the variable characterizing the respective surface flaw. The neural network is trained by means of the respective geometric map which comprises the boundary frame. The neural network can thus be trained using an item of position or location information of the respective surface flaw. The item of position or location information can thus be predicted by means of the neural network.

The respective pixel which is surrounded by the boundary frame is preferably a respective pixel at which the surface of the respective body component has a surface flaw. In other words, the variable assigned to the respective pixel and characterizing the respective surface flaw has a value which corresponds to an existing surface flaw.

The respective geometric map and the respective boundary frame, in particular coordinates of the boundary frame, are preferably stored in the electronic computing device, in particular the database. In other words, the surface flaws marked in the respective polygon network are surrounded in the geometric map by the boundary frame, the coordinates of which are stored in the electronic computing device, in particular in the database.

In a further embodiment, it is provided that a respective virtual target polygon network of at least one respective surface of a respective virtual target geometry of the respective body component is created. This can be understood in particular to mean the following: The respective virtual target polygon network, which approximates the virtual target geometry, is created from the respective virtual target geometry. The target geometry can be, for example, a CAD geometry of the surface of the respective body component. The target geometry has no production-related surface flaws and is therefore free of the production-related surface flaw. The target geometry is therefore a desired ideal geometry of the surface of the respective body component. The target polygon network is preferably an STL polygon network. The respective target polygon network can be stored in the electronic computing device, in particular in the database.

Preferably, at least the variable characterizing a respective curvature at at least one node of the respective target polygon network is determined. In other words, it can be provided that the at least one variable characterizing the curvature of the target polygon network is determined at the at least one node of the target polygon network.

Preferably, at least one respective two-dimensional geometric map of the respective target polygon network is formed, wherein the artificial neural network is trained at least indirectly, in particular directly, by means of the respective geometric map. In other words, the respective target polygon network is transformed as a geometric map into a two-dimensional plane, wherein the training of the neural network is carried out by means of the respective geometric map. The neural network can thus learn the ideal geometry of the target polygon network, by which precise predictions with respect to the surface flaws can be enabled by means of the neural network.

It is preferably provided that at least one pixel of the respective geometric map of the target polygon network is assigned the respective variable characterizing the curvature, wherein the neural network is at least indirectly, in particular directly, trained by means of the respective at least one pixel of the geometric map assigned the variable characterizing the curvature.

Further features of the invention result from the claims, the figures, and the description of the figures. The features and combinations of features mentioned above in the description and the features and combinations of features mentioned hereinafter in the description of the figures and/or shown solely in the figures are usable not only in the respective indicated combination but also in other combinations or alone.

The invention will now be explained in more detail on the basis of a preferred exemplary embodiment and with reference to the drawings. In the figures:

DETAILED DESCRIPTION OF THE DRAWINGS

In the figures, identical or functionally identical elements are provided with identical reference signs.

Figure 1:
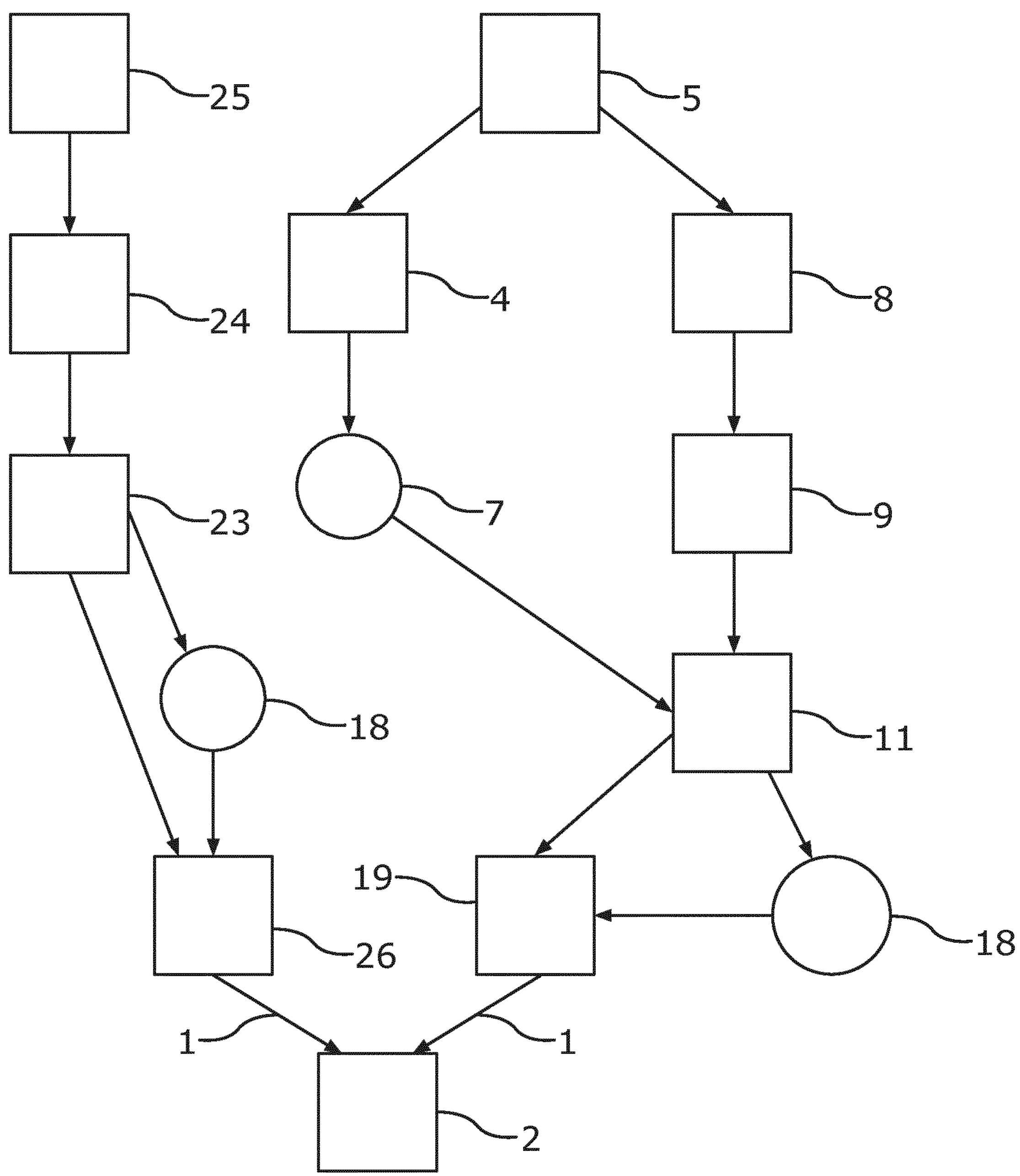
FIG. 1 shows a schematic method diagram of a method according to the invention for training an artificial neural network.
Figure 2:
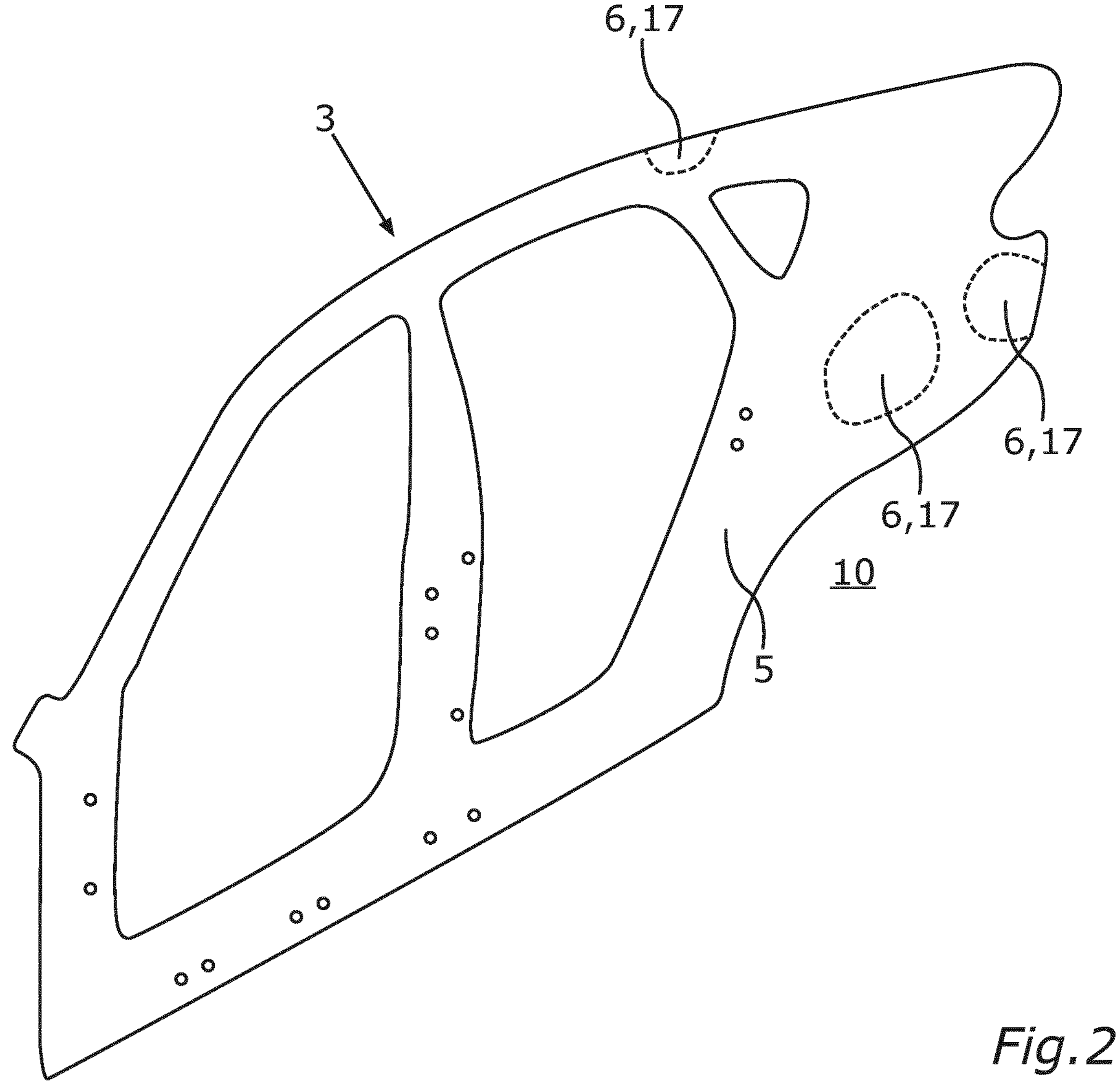
FIG. 2 shows a schematic perspective view of a body component on which a method according to the invention can be carried out.

FIG. 1 shows a schematic method diagram of a method for training 1 an artificial neural network 2. The artificial neural network 2 is preferably a region-based convolutional neural network (R-CNN). FIG. 2 shows a schematic perspective view of a body component 3 of a motor vehicle. The body component 3 is designed in the exemplary embodiment as a side frame of the motor vehicle or a body of the motor vehicle. The body component 3 is in the exemplary embodiment an outer skin component of the body of the motor vehicle. The body component 3 shown in FIG. 2 is an exemplary body component since the method is carried out for a large number of such body components 3.

In the method, an assessment 4 is first carried out for the body components 3. The assessment 4 can in particular be designated as an evaluation. In the assessment 4, at least one respective surface 5 of the respective body component 3 is examined, in particular manually, for surface flaws 6 in the line. The assessment 4 or the examination is preferably carried out by experts. The respective surface flaw 6 can be understood in particular as a deviation between a target condition of the respective surface 5 and an actual condition of the respective surface 5. The respective surface flaw 6 can be, for example, a dent or a waviness of the surface 5. The respective body component 3 is preferably a painted body component 3, in particular painted black.

In the assessment 4, preferably at least one respective variable 7 characterizing the respective surface flaw 6 of the respective surface 5 of the respective body component 3 is determined, in particular manually. The variable 7 can be designated in particular as a flaw variable. The variable 7 characterizing the respective surface flaw 6 can comprise, for example, a respective parameter, which describes whether the respective surface 5 has a surface flaw 6 or whether the respective surface 5 is free of the surface flaw 6. Alternatively or additionally, the variable 7 characterizing the respective surface flaw 6 can comprise at least one parameter which characterizes a respective flaw class of the respective surface flaw 6. The respective flaw class can be, for example, the dent or the waviness of the respective surface 5. Alternatively or additionally, the variable 7 characterizing the respective surface flaw 6 can comprise at least one parameter, which characterizes a flaw severity of the respective surface flaw 6, designated in particular as the flaw intensity. Alternatively or additionally, the variable 7 characterizing the respective surface flaw 6 can comprise at least one parameter, which characterizes or describes a respective location or respective position of the respective surface flaw 6 on the respective surface 5.

Figure 3:
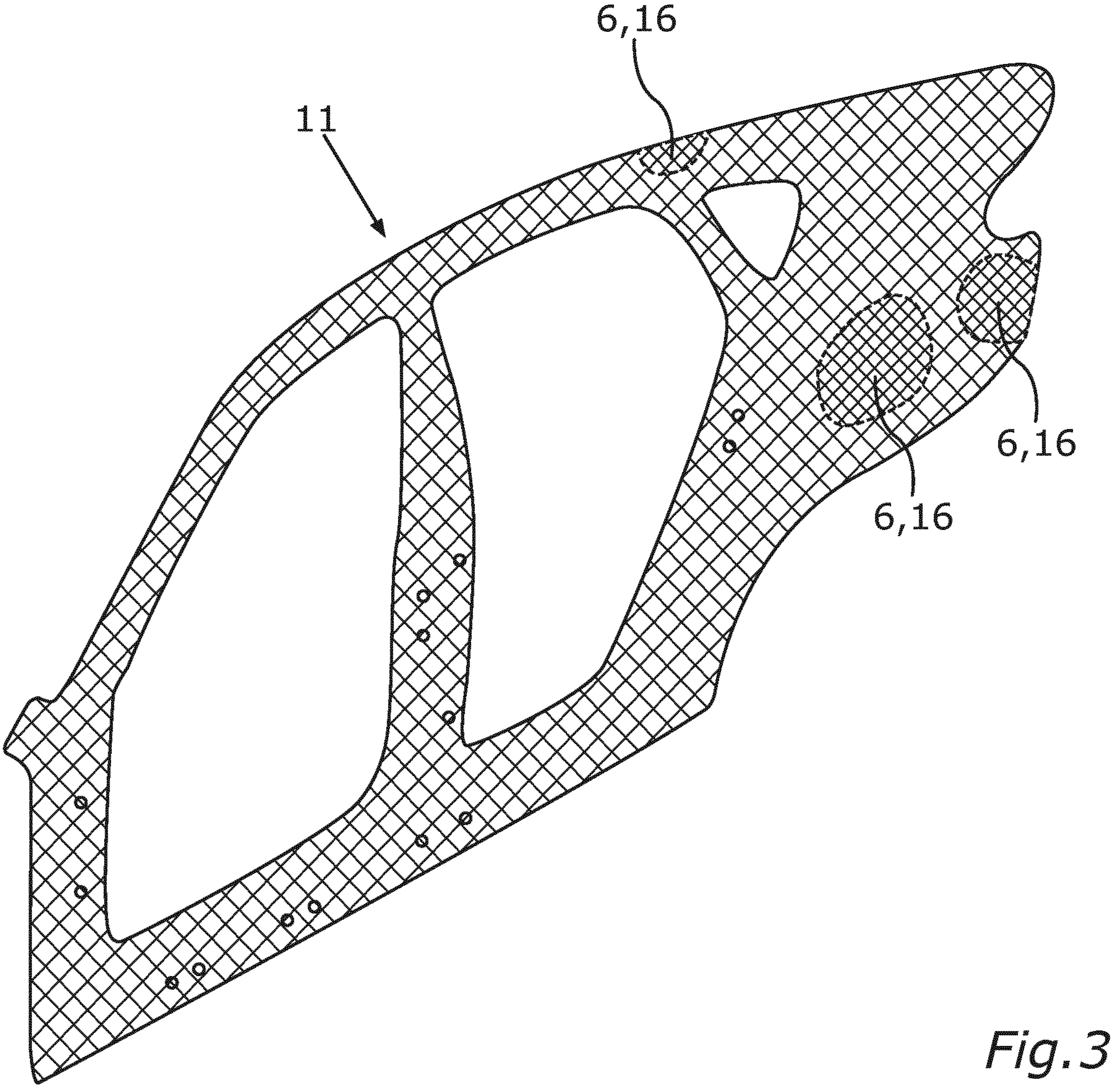
FIG. 3 shows a schematic perspective view of a virtual polygon network of the body component from FIG. 2.
Figure 4:
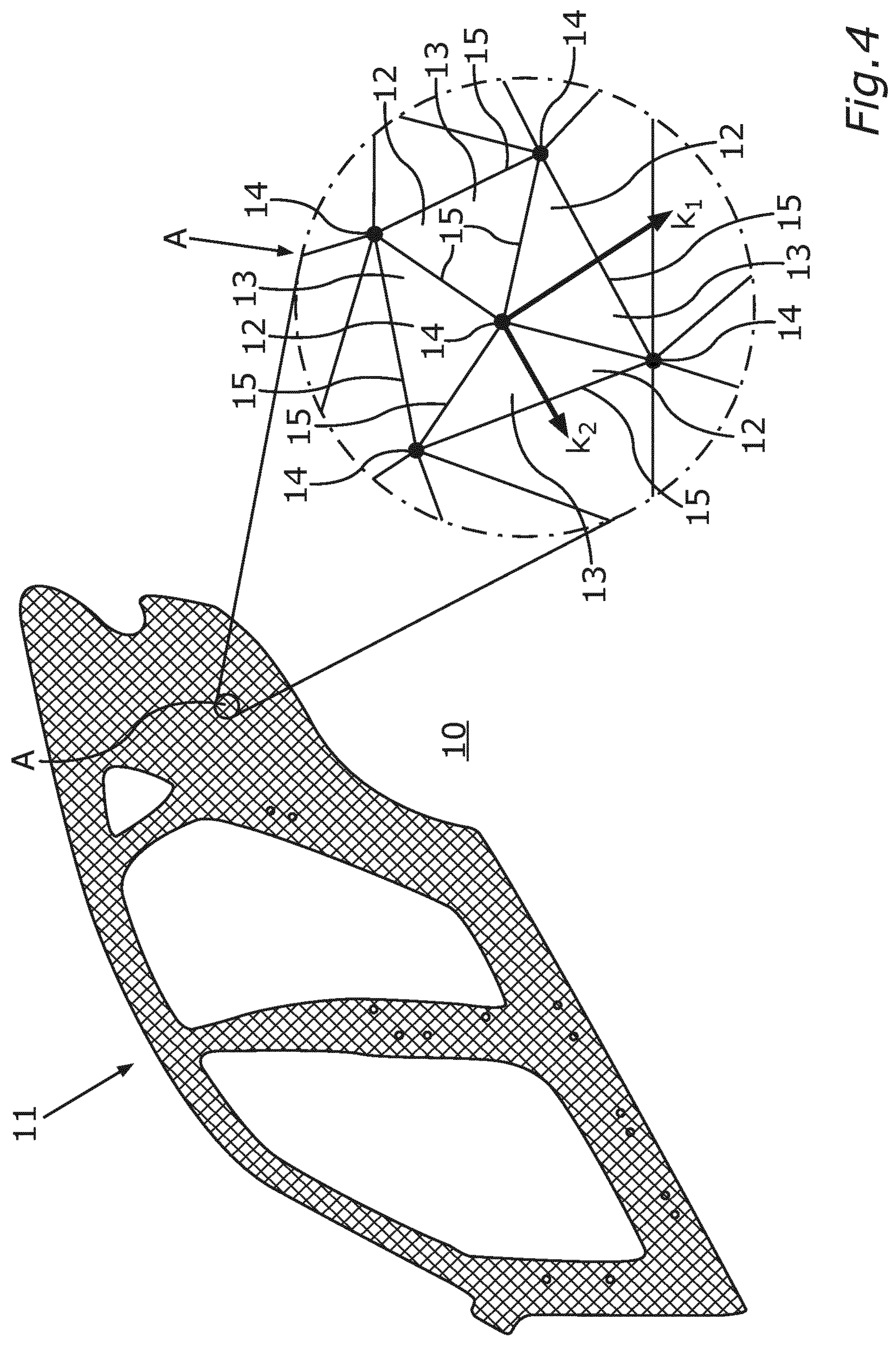
FIG. 4 shows a schematic perspective view of a virtual polygon network of the body component from FIG. 2 to illustrate items of curvature information.

At least one respective image 9 of the surface 5 respectively arranged in a capture area 10 of the optical capture device 8 is captured by means of an optical capture device 8. A respective virtual polygon network 11 of the respective surface 5 of the respective body component 3 is created in dependence on the respective captured image 9. In other words, the body components 3, on which the assessment 4 was performed, are digitized by means of the optical capture device 8 as the polygon network 11. FIG. 3 shows the polygon network 11 of the service 5 of the body component 3 in a schematic perspective view. The respective polygon network 11 comprises a large number of polygons 12 in each case. FIG. 4 shows the polygon network 11 in a schematic perspective view, wherein respective polygons 12 are illustrated in a partial view A.

In a further embodiment, it is provided that the respective variable 7 characterizing the respective surface flaw 6 of the respective surface 5 of the respective body component 3 is assigned to a respective polygon 12 of the respective polygon network 11. The variable 7 can be assigned, for example, to at least one respective surface 13 and/or at least one respective node 14 and/or at least one respective edge 15 of the respective polygon 12.

The assignment of the respective variable 7 characterizing the respective surface flaw 6 can be carried out, for example, in two variants. In a first variant, in the respective polygon network 11, the respective polygon 12 or a respective area 16 which comprises several of the respective polygons 12 is marked. The area 16 corresponds here to a respective area 17 or approximates the respective area 17 at which the respective surface flaw 6 has been identified on the real component. In other words, the area 16 is a virtual map of the area 17. The marking can be carried out manually.

In the second variant, the respective area 17 which comprises the respective surface flaw 6 is marked on the body component 3 and thus on the real component. The image 9 captured by means of the optical capture device 8 thus also comprises the marked area 17. In this way, upon the creation of the respective virtual polygon network 11 in dependence on the image 9, which in particular comprises the area 17, the respective polygon 12 or the respective virtual area 16 can be marked, in particular automatically, upon the creation of the respective polygon network 11.

The respective polygon network 11 and the respective variable 7 are preferably stored in an electronic computing device, in particular a database. The polygon networks 11 are preferably smoothed, i.e., smoothing of the polygon networks 11 can be carried out. The smoothed polygon networks 11 can be stored in the electronic computing device, in particular the database. It is possible that further method steps, in particular all further method steps, can be carried out using the smoothed polygon networks 11 or the unsmoothed polygon networks 11.

It is provided that in the respective polygon network 11, which is stored in particular in the electronic computing device, at least one respective variable 18 characterizing a curvature of the respective polygon network 11 is determined at at least one of the nodes 14 of the respective polygon network 11. This is preferably carried out for all polygon networks 11 stored in the electronic computing device. Preferably, this is carried out at all nodes 14 of the respective polygon network 11. The variable 18 characterizing the respective curvature can comprise, for example, main curvatures k1, k2 and/or main curvature directions and/or a shape index s and/or an intensity index c of the respective node 14 or at the respective node 14. In other words, the variable 18 characterizing the curvature can comprise multiple subvariables 18*a-d*, which can be designated in particular as subitems of information. For example, a first of the subvariables 18*a* can be a first of the main curvatures K1. For example, a second of the subvariables 18*b* can be the second main curvature K2. For example, a third of the subvariables 18*c* can be the shape index s. For example, the fourth subvariable 18*d* can be the intensity index c.

The main curvatures k1, k2 and the main curvature directions can be calculated, for example, by means of a mathematical map designated in particular as a Weingarten map in dependence on the respective polygon network 11, in particular the nodes 14. The shape index s and the intensity index c can be calculated, for example, in dependence on the main curvatures k1, k2 and/or the main curvature directions. Preferably, the respective variable 18, which in particular is designated as curvature information and characterizes the curvature, of the polygon networks 11 is stored in the electronic computing device, in particular the database.

Figure 5:
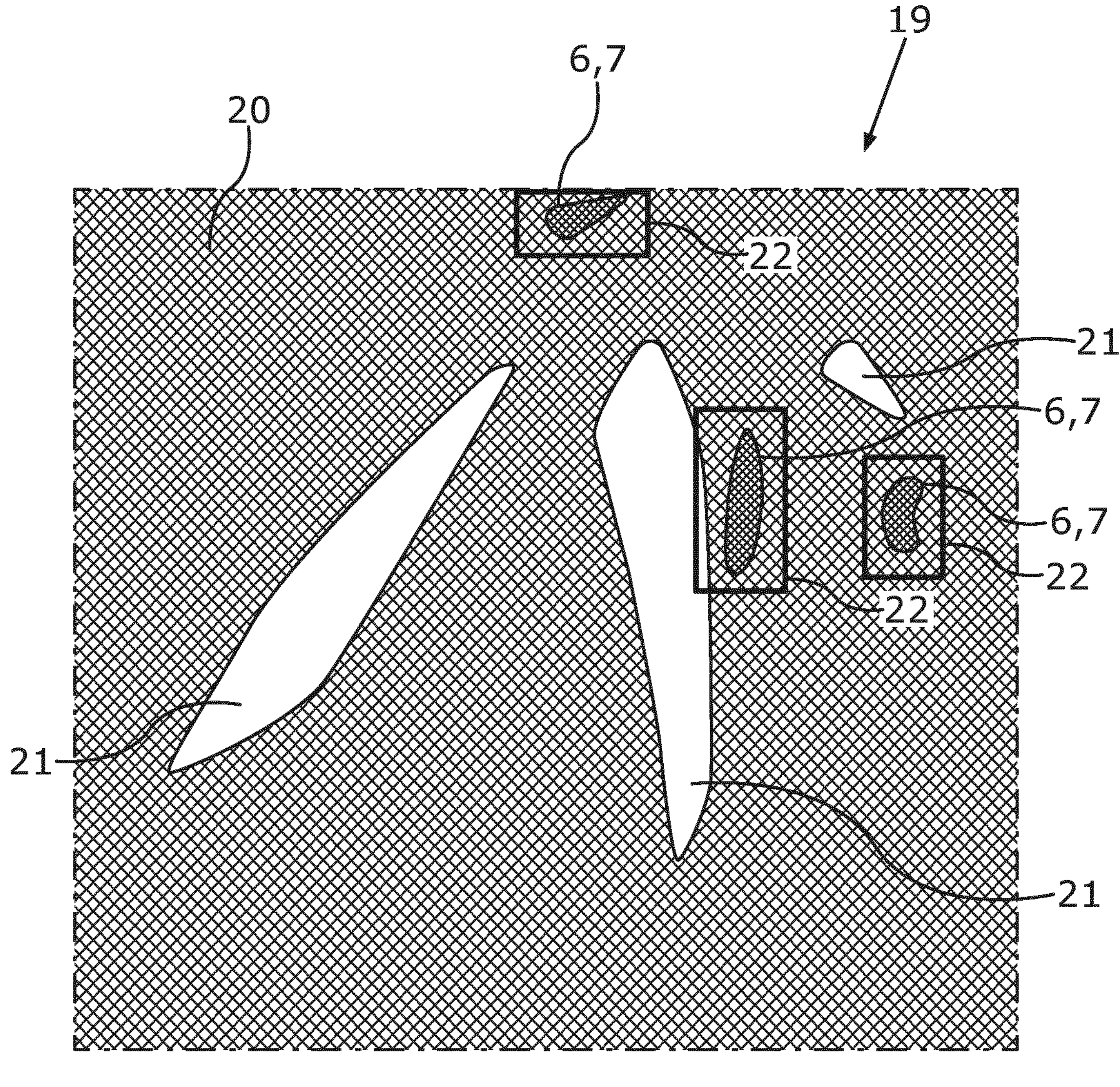
FIG. 5 shows a schematic representation of a two-dimensional geometric map of a virtual polygon network.

It is provided that at least one two-dimensional geometric map 19 of the respective polygon network 11 is formed. FIG. 5 shows a schematic representation of the two-dimensional geometric map 19. The respective geometric map 19 comprises a plurality of pixels 20, wherein each of the pixels 20 is or will be assigned at least one node 14 of the respective polygon network 11. The respective geometric map 19 can have at least one subarea 21, which is not assigned to a polygon 12 or a node 14 of the respective polygon network 11. The subarea 21 is a map of an image area of the respective image 9, wherein the image area, if one were to display the image 9, would not show the respective surface 5 of the body component 3. The subarea 21 can therefore characterize or correspond, for example, to a recess of the body component 3. In other words, the subarea 21 differs from the remaining areas of the geometric map 19 in that the subarea 21 does not have any networks or does not map the polygon network 11. Several of the subareas 21 are shown in FIG. 5. These correspond to respective door areas or window areas of the motor vehicle or map the respective door areas or window areas. The geometric map 19 is preferably formed by means of authalic spherical parameterization from the respective polygon network 11.

In a further embodiment, it is provided that the variable 18 characterizing the respective curvature is assigned to at least one of the pixels 20 of the respective geometric map 19. For example, the geometric map 19, in particular the pixels 20, can be colored in dependence on the variable characterizing the curvature.

For example, precisely one of the geometric maps 19 can be formed for each of the polygon networks 11, wherein the at least one pixel 20 of the precisely one geometric map 19 can be assigned multiple, in particular all of the, subvariables 18*a-d* of the variable 18 characterizing the respective curvature. Alternatively, multiple geometric maps 19 can be formed for each of the polygon networks 11, wherein each of the multiple geometric maps 19 is assigned precisely one of the subvariables 18*a-d* at at least one of the pixels 20.

The geometric maps 19 are preferably stored in the electronic computing device, in particular the database.

It is provided that the artificial neural network 2 is trained by means of the geometric maps 19, which comprise the variable 18 characterizing the curvature, in particular at least one of the subvariables 18*a-d*. It is therefore provided that the artificial neural network 2 is trained at least indirectly by means of the variables 18 characterizing the curvature.

It is preferably provided that at least one of the pixels 20 of the respective geometric map 19 is assigned the respective variable 7 characterizing the respective surface flaw 6. The artificial neural network 2 can be trained by means of the respective geometric map 19, which comprises the respective variable 7 characterizing the respective surface flaw 6.

In a further embodiment, it is provided that at least one boundary frame 22 is created in the respective geometric map 19, which completely surrounds the at least one pixel 20, which is assigned the variable 7 characterizing the respective surface flaw 6. The artificial neural network 2 is trained by means of the respective boundary frame 22 or by means of the respective geometric map 19 which comprises the respective boundary frame 22.

In a further embodiment, it is provided that a respective virtual target polygon network 23 of at least one respective surface 24 of a respective virtual target geometry 25 of the respective body component 3 is created. The virtual target geometry 25 is preferably a CAD geometry of the respective surface 5 or the respective body component 3. The target geometry 25 preferably does not comprise any production-related surface flaws 6. The virtual target polygon network 23 can be stored in the electronic computing device, in particular in the database.

The variable 18 characterizing the respective curvature is preferably determined on the respective virtual target polygon network 23. It is therefore preferably provided that the at least one respective variable 18 characterizing the curvature of the respective target polygon network 23 is determined at at least one node 14 of the respective target polygon network 23.

It is preferably provided that at least one respective two-dimensional geometric map 26 of the respective target polygon network 23 is formed. The geometric map 26 differs in particular from the geometric map 19 in that the geometric map 26 does not comprise the production-related surface flaws 6 or the boundary frame 22. The geometric map 26 is therefore free of the production-related surface flaws 6 or the boundary frame 22.

Preferably, at least one pixel of the geometric map 26 is assigned the variable 18 characterizing the respective curvature of the target polygon network 23, wherein the artificial neural network 2 is trained by means of the geometric map 26, which comprises the variable 18 of the virtual target polygon network 23 characterizing the curvature. The respective geometric map 26 can be stored in the electronic computing device.

Data stored in the electronic computing device, in particular in the database, are preferably used to train 1 the artificial neural network 2. The data comprise here the geometric map 19, in particular the variable 18 of the polygon network 11 characterizing the curvature and/or the variable 7 characterizing the respective surface flaw 6 and/or the respective boundary frame 22 and/or the geometric map 26, in particular the respective variable 18 of the target polygon network 23 characterizing the curvature. The first main curvature k1 and/or the second main curvature k2 and/or the shape index s and/or the intensity index c can be used as the variable 18 characterizing the curvature.

The goal of the training 1 is that the trained neural network 2 is capable of predicting or recognizing the respective surface flaw 6, in particular already during a development of the body component 3 and/or the forming tool. In other words, the neural network 2 can be used after the training 1 for localizing and/or classifying respective surface flaws 6 in polygon networks, in particular in the target polygon network 23. Production effort and production costs of the body components 3 can thus be kept particularly low, in particular in relation to manual localizing or classification of the surface flaws 6.

Figure 6:
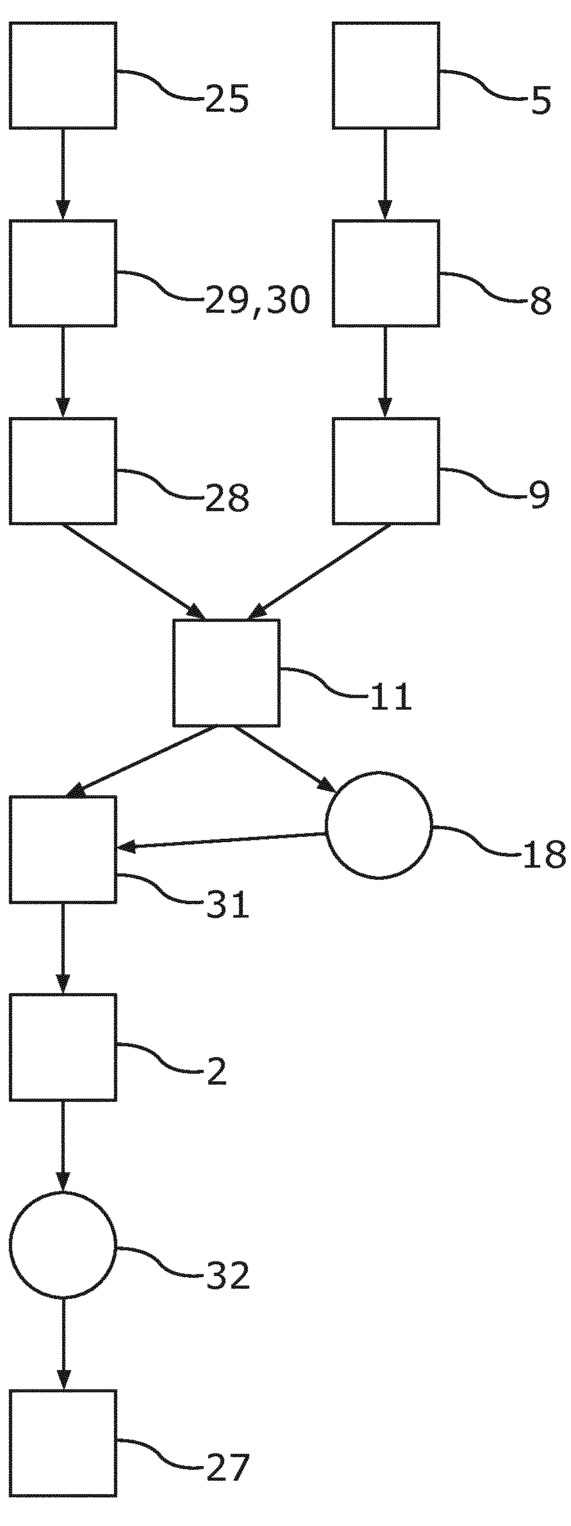
FIG. 6 shows a schematic method diagram of a method for evaluating a surface of a body component.

FIG. 6 shows a schematic method diagram of a method for evaluating 27 the respective surface 5 of the body component 3 of the motor vehicle by means of the trained artificial neural network 2. At least one image 9 of the surface 5 of the body component 3 arranged in the capture area 10 of the optical capture device 8 is captured by means of the optical capture device 8. The virtual polygon network 11 of the surface 5 is created in dependence on the captured image 9. The polygon network 11 can thus be generated by digitizing the body component 3 by means of the capture device 8.

Alternatively, the virtual polygon network 11 can be created in dependence on at least one simulation result 28 of a simulation 29, which is structural-mechanical and/or thermomechanical in particular, of at least one step of a simulated production process 30 of the body component 3. The simulation 29 is preferably a finite element simulation (FEM), which is in particular three-dimensional. The simulation 29 is carried out here using a target geometry 25 of the body component 3. The virtual polygon network 11 is preferably stored in the electronic computing device, in particular in the database.

After the creation of the virtual polygon network 11 of the surface 5, the variable 18 characterizing the curvature is determined for the virtual polygon network 11. It is therefore provided that the at least one variable 18 characterizing the curvature of the polygon network 11 is determined at at least one node 14 of the virtual polygon network 11. The variable 18 of the polygon network 11 characterizing the curvature is preferably stored in the electronic computing device, in particular in the database.

Figure 7:
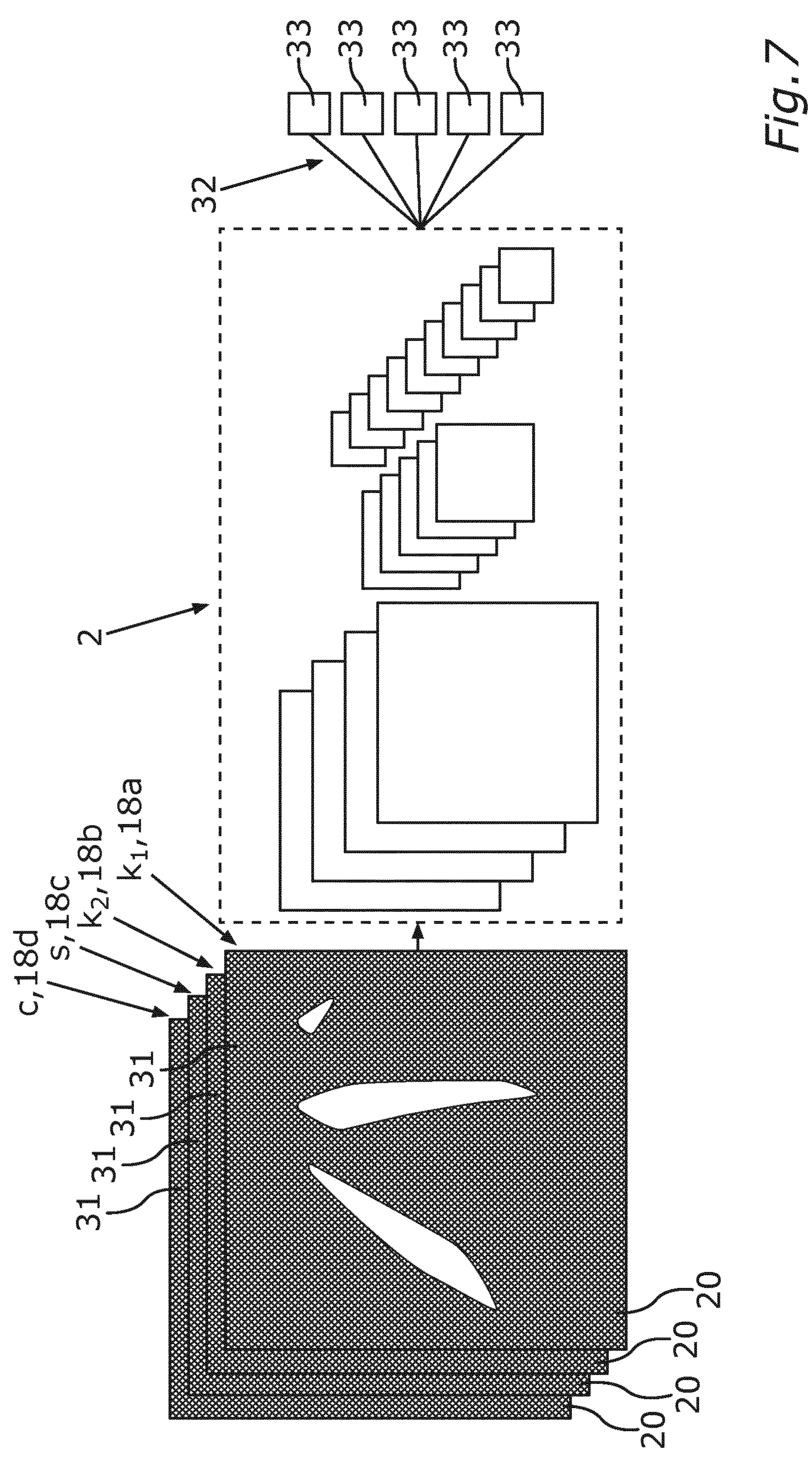
FIG. 7 shows a schematic illustration of a prediction by means of an artificial neural network by means of a method according to the invention.

In a further embodiment, it is provided that at least one two-dimensional geometric map 31 of the polygon network 11 is formed, wherein in dependence on the geometric map 31, at least one output variable 32 characterizing a surface flaw 6 of the surface 5 is determined by means of the artificial neural network 2. FIG. 7 shows a schematic representation of an illustration of the neural network 2 or a prediction of the output variable 32 in dependence on the geometric map 31. It is preferably provided that at least one pixel 20 of the geometric map 31 is assigned the respective variable 18 characterizing the curvature of the polygon network 11.

The geometric map 31 differs in particular from the geometric map 19 in that the geometric map 31 does not comprise the surface flaws 6 or the boundary frame 22. The geometric map 31 is therefore free of the surface flaws 6 or the boundary map 22. The geometric map 31 can thus be used as an input variable of the artificial neural network 2.

For example, precisely one geometric map 31 can be formed for the polygon network 11, wherein multiple, in particular all, of the subvariables 18*a-d* of the variable 18 characterizing the respective curvature can be assigned to the at least one pixel 20 of the precisely one geometric map 31. Alternatively, multiple geometric maps 31 can be formed for the polygon networks 11, wherein precisely one of the subvariables 18*a-d* is assigned to each of the multiple geometric maps 31 at at least one of the pixels 20.

For example, a first of the geometric maps 31 can be assigned the first subvariable 18*a*, in particular the first main curvature k1, at at least one of the pixels 20. Alternatively or additionally, a second of the geometric maps 31 can be assigned the second subvariable 18*b*, in particular the second main curvature k2, at at least one of the pixels 20. Alternatively or additionally, a third of the geometric maps 31 can be assigned the third subvariable 18*c*, in particular the shape index s, at at least one of the pixels 20. Alternatively or additionally, a fourth of the geometric maps 31 can be assigned the fourth subvariable 18*d*, in particular the intensity index c, at at least one of the pixels 20. This is illustrated in FIG. 7.

In dependence on the at least one pixel 20 assigned the variable 18 characterizing the curvature, which comprises in particular at least one of the subvariables 18*a-d*, the output variable 32 characterizing the surface flaw 6 is determined by means of the artificial neural network 2. In other words, in dependence on the geometric map 31 or the geometric maps 31, which comprises the variable 18 characterizing the curvature, in particular at least one of the subvariables 18*a-d*, the output variable 32 characterizing the surface flaw 6 is determined by means of the artificial neural network 2. Therefore, the at least one output variable 32 characterizing the surface flaw 6 of the surface 5 is determined to evaluate 27 the surface 5 at least indirectly in dependence on the variable 18 characterizing the curvature by means of the artificial neural network 2. Digital or digitized body parts 3, in particular from tool training, can be evaluated or assessed with respect to the surface flaw 6 by means of the trained neural network 2. Any surface flaws 6 can thus be identified, in particular localized or classified, for example, in a particularly early development phase of the body component 3. Production effort and production costs of the body components 3 can thus be kept particularly low, in particular in relation to manual localizing or classifying of the surface flaws 6.

The output variable 32 is preferably a vector designated in particular as a result vector. The output variable 32 can be identical to the variable 7 characterizing the surface flaw 6 or the output variable 32 and the variable 7 can be at least partially different from one another. The result vector preferably comprises multiple components 33. At least one of the components 33 preferably comprises coordinates of the boundary frame 22. The location or position of the surface flaw 6, which has been predicted by means of the artificial neural network 2, can thus be localized by means of the output variable 32. At least one of the components preferably comprises the classification of the respective surface flaw 6. Thus, for example, in particular the class of the surface flaw 6 designated as a flaw type and/or in particular the flaw severity of the surface flaw 6 designated as the flaw intensity can be predicted by means of the artificial neural network 2.

LIST OF REFERENCE SIGNS

1 training
2 neural network
3 body component
4 assessment
5 surface
6 surface flaw
7 variable
8 capture device
9 image
10 capture area
11 polygon network
12 polygon
13 surface
14 node
15 edge
16 area
17 area
18 variable
18*a* first subvariable
18*b* second subvariable
18*c* third subvariable
18*d* fourth subvariable
19 map
20 pixel
21 subarea
22 boundary frame
23 target polygon network
24 surface
25 target geometry
26 map
27 evaluate
28 simulation result
29 simulation
30 production process
31 map
32 output variable
33 components
A detail view
c intensity index
k1 first main curvature
k2 second main curvature
s shape index

What is claimed is:

1. A method for evaluating a surface of a body component of a motor vehicle, the method comprising:
- creating a plurality of virtual polygon networks of the surface;
- determining at least one variable characterizing a curvature of each of the plurality of virtual polygon networks at at least one node of each of the plurality of virtual polygon networks, the at least one variable including a plurality of sub-variables; and
- determining, by an artificial neural network, in dependence on the at least one variable characterizing the curvature, at least one output variable characterizing a surface flaw of the surface to evaluate the surface;
- wherein a plurality of two-dimensional geometric maps of the virtual polygon network are formed for each of the plurality of virtual polygon networks, each of the plurality of two-dimensional geometric maps including a plurality of pixels, each of which is assigned at the at least one node; and
- wherein each of the plurality of two-dimensional geometric maps is assigned only one of the plurality of sub-variables at at least one pixel of the plurality of pixels, and the output variable characterizing the surface flaw is determined in dependence on the plurality of two-dimensional geometric maps by the artificial neural network.

2. The method according to claim 1, wherein at least one image of the surface arranged in a capture area of the optical capture device is captured by an optical capture device, wherein the plurality of virtual polygon networks is created in dependence on the image.

3. The method according to claim 1, wherein the virtual polygon network is created in dependence on at least one simulation result of a simulation of at least one step of a production process of the body component.

4. The method according to claim 2, wherein the virtual polygon network is created in dependence on at least one simulation result of a simulation of at least one step of a production process of the body component.

5. The method according to claim 1, wherein each of the plurality of pixels is colored in dependence on the variable characterizing the curvature.

* * * * *